Fig. I.

INVENTOR.
JOHN L. BOYEN
BY
Townsend and Townsend

INVENTOR.
JOHN L. BOYEN

# United States Patent Office 3,372,677
Patented Mar. 12, 1968

3,372,677
TOTAL ENERGY CONSERVATION SYSTEM
John L. Boyen, Orinda, Calif., assignor, by mesne assignments, to Vapor Corporation, Chicago, Ill., a corporation of Delaware
Continuation of application Ser. No. 419,615, Dec. 18, 1964. This application Dec. 27, 1966, Ser. No. 604,945
5 Claims. (Cl. 122—7)

ABSTRACT OF THE DISCLOSURE

A system for recovering the energy in exhaust gases from a turbine or like heat generating apparatus by forcing such gases through a heat exchanger. A system for automatically controlling or bypassing exhaust gases into apparatus so that creation of excessive back pressure is avoided and so that temperatures in the heat exchanger are controlled. A heat exchanger having spirally formed water tubes in which water is directed from the inner end of the spiral to the outer end thereof and provisions for forcing the hot exhaust gases from the outer periphery of the spiral water tube radially inwardly toward the center of the spiral.

---

This is a continuation of United States patent application S.N. 419,615, filed Dec. 18, 1964, now abandoned.

This invention relates to an improved system and apparatus particularly adapted to provide a high percentage of heat recovery from waste exhaust gases such as those from a gas turbine.

Recent improvements in gas turbines along with expanded demands for electrical energy in many industries has resulted in an increase in the use of such turbines for the generation of electrical energy at the immediate site of use. This has occurred in small as well as medium and large industrial installations which also usually have a need for steam for various production processes and/or plant heating or cooling.

The gas turbine exhaust is a source of heat which represents a plant energy loss if not utilized. Such exhaust gases are usually in a relatively low temperature range, i.e., 750° to 1050° F., without supplementary firing, but are suitable for steam generation by various techniques in the art of heat recovery boilers.

To obtain effective utilization of waste heat available from devices such as modern gas turbines, several problems must be reasonably resolved simultaneously in a manner that has not been demonstrated entirely successfully in the prior art. Foremost among these is the design of a system whose interaction with the primary source of heat affords minimal interference with the latter's operating cycle, e.g. reflecting a minimum back pressure to the primary exhaust source. The system must also be able to produce maximum steam generation within a minimum time period in order to respond promptly to a variety of steam load needs within the main plant. Because waste heat recovery is generally an auxiliary type of equipment, i.e. secondary to the primary electrical energy generation of the turbine and generator combination, most modern industrial installations demand that the heat recovery unit be limited to an absolute minimum in space. A typical installation, for example, using a conventional heat recovery system capable of about 5000 pounds of steam per hour, normally would entail an installation having a boiler section alone of about 20 feet in length, 8 feet of width and about 10 to 12 feet of height with an additional clear space requirement for tube removal of 16 feet. A comparable installation using the system of this invention would only occupy a space of 7 feet by 9 feet by 6 feet with a minimum of additional requirement of clear space for tube removal.

Another problem encountered using conventional techniques in the control of gas flow into a heat recovery system is that at least two valves are required to achieve proper hot gas inlet control, by-pass control and boiler isolation, when required. In using two valves or dampers to achieve these functions, it is very difficult to obtain proper balancing between the valve damper positions. This is made even more difficult when it is desired to tie in two or more hot gas exhaust sources to a single heat recovery unit with varying outputs from each source as is often the case in many industrial applications.

Thus it is an object of this invention to provide a heat recovery system having a minimal effect on the primary power source by minimizing imposed back pressures while at the same time providing for automatically balanced hot gas inlet, by-pass and isolation. For achieving this object the present invention includes a heat exchanger through which hot exhaust gases are directed, which heat exchanger is arranged to impose only slight resistance to gas flow, the amount of resistance being substantially independent of the rate of gas flow. The structure affording such mode of operation includes a heat exchanger that has a gas path converging radially inwardly of a circle so that as the gas velocity is reduced in response to cooling of the gas, the cross-sectional area of the gas flow path is correspondingly reduced. Automatic control of the system is thereby facilitated.

A feature and an advantage of this system is that the output of several exhaust sources may be accommodated by a single unit with a little or no problem in achieving proper balance between hot exhaust gas inlet and by-pass.

Another object of this invention is to provide means in a heat recovery system for automatic regulation of the hot waste gas source inlet and by-pass, the feedwater supply to the boiler, the water level in the system, and the steam pressure at the output of the heat recovery system. In particular the automatic regulation of this invention achieves equilibrium between the selective division of the flow of gas to the boiler and atmosphere, the flow of water provided by the feedwater source, and a relatively constant predetermined level of steam pressure at the outlet of the boiler and steam separator.

A further object of this invention is to provide a plenum or waste gas inlet chamber whose outlet may be automatically and selectively controlled to provide a regulated amount of hot gas to the boiler for controlled steam generation and expel any excess to the atmosphere. A feature and an advantage of this arrangement is that more than one hot gas exhaust source may be handled without overheating the boiler tube bundle and while maintaining a controlled steam pressure at the output.

A further object of my invention is to provide a water tube boiler arrangement in combination with a steam separator which may accommodate forced feedwater recirculation to cause a surplus of water in the water tubes of the boiler. In this manner optimum heat transfer boundary conditions are maintained between the internal fluid of the steam generating boiler, the water tubes themselves, and the heat transferred from the counter flow hot gas source exterior to the tubes. A feature and and advantage of this arrangement is that maximum steam generation may be accomplished within a very few minutes of the time the hot gases are introduced to the heat recovery system.

Another object of my invention is to provide automatic safety features which prevent the system from developing "hot spots" on the boiler coils and, in the event that the feedwater source or pressure should fall below a certain predetermined value, shunt all incoming hot gases to the atmosphere.

It is a further object to provide a combination of automatic controls whereby a given predetermined steam pressure and volume output may be obtained from the system without reliance upon human operational skills and to provide for shut down of the system when such output tends to become excessive.

It is also an object of this invention to provide the system with a novel form of water tube boiler which utilizes a special spiral pancake arrangement of finned water tubes to achieve a minimum pressure drop of the hot gases passed therebetween while producing turbulence in the gas flow. The tube arrangement is such as to achieve counterflow between the water being heated internally and the hot gases passing the tubes externally.

A feature and advantage of the spiral tube arrangement of my invention is that a minimum of space is required for tube removal and maintenance and that a large part of the maintenance of such a boiler may be effectuated with the tubes in place.

Another advantage of the finned tube spiral arrangement is that this novel design achieves maximum turbulence of the heating gases and hence maximum heat transfer efficiency and a minimum period to achieve steam output generation.

Another object of this invention is to provide a single gas valve to control both hot exhaust gas admission and by-pass with a single gas damper. A feature and advantage of this arrangement is that one valve performs three functions; namely, inlet control, by-pass control, and boiler isolation when in a closed position. Normally these functions would require at least two valves using conventional techniques.

Another feature and an advantage of the design of my invention is that it makes possible standardization of design and to satisfy virtually all applications with a single casing construction and a standard heating surface element. The inlet for the exhaust heat gas may be located in any of a number of different locations and may take the form of either a single inlet in the front or an inlet at the side or an inlet at the bottom to accommodate different turbine arrangements and numbers of turbines. A removal cover at the top of the boiler enclosure makes the entire water tube assembly accessible for cleaning or complete removal. The insulated casing assists in sound attenuation and if additional sound attenuating material in the by-pass and inlet ducting is required, this may all be confined to the gas control rather than the whole boiler system including by-pass ducting as is required using known techniques.

Numerous other objects, features and advantages of my invention will become apparent from a reading of the detailed specification that follows which shows one embodiment of my invention which I have found satisfactory under actual operating conditions.

Turning now to the drawings.

This invention embodies apparatus which provides a high percentage of heat recovery from turbine exhaust gases by conveying the latter directly through a plenum and by-pass chamber to a compact water tube bundle wherein usable steam is generated. Forced recirculation is utilized to provide at least 50 percent excess water in the tube bundle, and the steam generated therein is subsequently separated by apparatus external to the tube bundle. The exhaust gases pass through a variable by-pass valve arrangement so that steam generation within the water tube bundle may be varied by the setting of the by-pass valve as the steam demand requires. The entire unit may be matched to the characteristics of the individual gas turbine to which it is connected including the minimization of back pressure. Because forced recirculation of water through the tube bundle is provided, full steam production generally may be attained in a very few minutes under normal load conditions. Gas flow is normal to the tube surfaces and is caused to be highly turbulent. This feature combined with the forced water recirculation in the water tubes achieves a heat transfer capability many times higher per lineal foot of tubing than other types of heat recovery boilers which I am familar with. Such increase in overall system efficiency allows a substantial reduction in space required per lb-hour of steam output compared to other types of heat recovery systems which might be adapted to gas turbines. The space requirement reduction also yields substantial savings in site construction, installation, and transportation costs.

Figure 1:
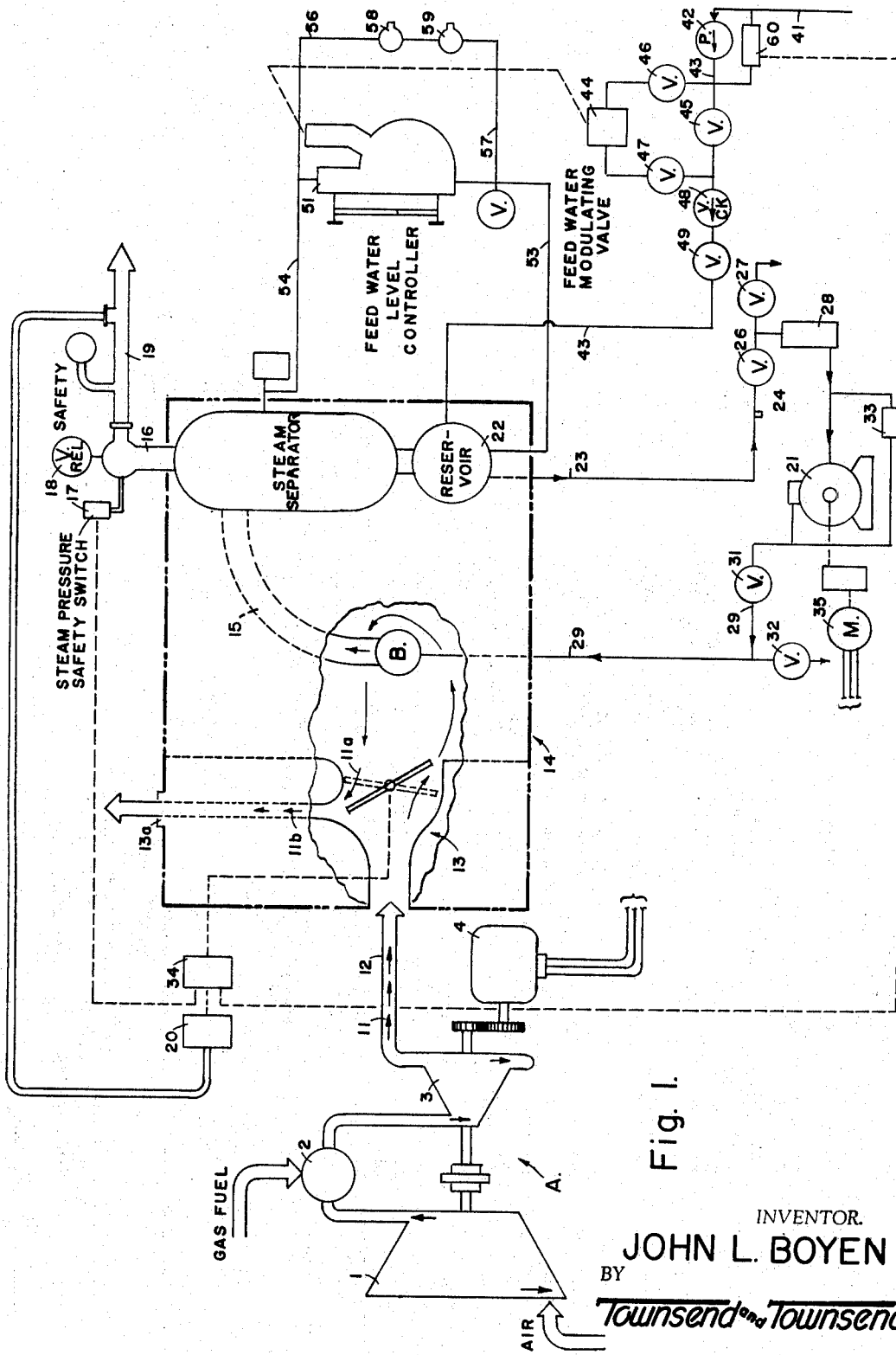
FIG. 1 is a schematic flow diagram showing my entire total energy conservation system.

The invention is best understood by referring first to FIG. 1 which is a schematic flow diagram of my overall total energy conservation system. At the left side of the figure there is shown generally a gas turbine power unit comprising compressor 1, combustor 2, and gas turbine 3 assembled together in a conventional manner. Under normal running conditions, the turbine unit takes in air at the left side of the compressor as shown, while gas fuel is introduced to the combustor for ignition with the compressed air delivered from the compressor; the high energy jet of ignited fuel is then caused to impinge during its expansion upon the blades (not shown) of gas turbine 3 and cause rotation thereof. The rotational energy thus generated is used to turn the compressor and, through appropriate couplings and gearing, may be used also to turn dynamo or alternator 4 for the generation of D.C. or A.C. electrical energy. The output of the electrical generator then may be distributed to various points of electrical power consumption; for example, in a process plant, office building, hospital or the like.

The hot exhaust gases indicated by arrows 11 expelled by the gas turbine are conveyed by means of duct 12 to gas plenum and by-pass valve housing indicated generally at 13. The hot gases are then diverted in whole or in part, further explained hereinafter, into the tube bundle casing indicated generally at 14 wherein the hot gases come into contact with the steam generating water tubes having water recirculated therethrough in at least 50% excess over the amount of steam generated. After heating the water tubes, cooled exhaust gases 11a are combined with any hot exhaust gases 11b which may have been by-passed away from the water tube bundle by the by-pass valve. The combined exhaust gases are then expelled through stack outlet 13a.

The fluid output of the water tube bundle, which is a mixture of steam and excess water, may be nozzled via conduit 15 into a cyclone steam water separator of a type similar to that shown in my co-pending patent application, "Method and Apparatus for the Cyclone Separation of Steam and Water Mixtures and the Like," Ser. No. 339,512, filed in the U.S. Patent Office on January 22, 1964; however, other conventional means of steam separation known in the art may be utilized. I prefer my own separator because I believe it yields the highest quality of steam available from a given mixture with a minimum of separator equipment and space. The high quality steam emanating from the separator is conveyed through conduit 16 which is also in fluid communication with the steam safety pressure switch 17, safety valve 18 and conduit 19 which is in fluid communication with steam pressure proportional controller 20, a conventional device which is indicated also in FIG. 2.

The water flow arrangement for my total energy conservation system is shown in the lower right hand portion of FIG. 1 and, as mentioned above, is of the type that maintains forced circulation of the water through the steam generating water tube bundle of the unit. This is accomplished by means of pump 21 which draws water from reservoir 22 through piping 23 past flushing connection plug 24, normally open isolating globe valve 26, adjacent normally closed blow down valve 27, and a conventional strainer assembly indicated generally at 28. The outlet of recirculating pump 21 is connected to piping 29 and hence to the water tube bundle of the boiler housed in casing 14. Normally open separating globe valve 31 and normally closed flushing connection valve 32 are provided in line 29 for maintenance and cleaning. Differential pressure switch 33 is connected across pump 21 and linked electrically to the by-pass valve air motor controller indicated generally at 34.

Figure 2:
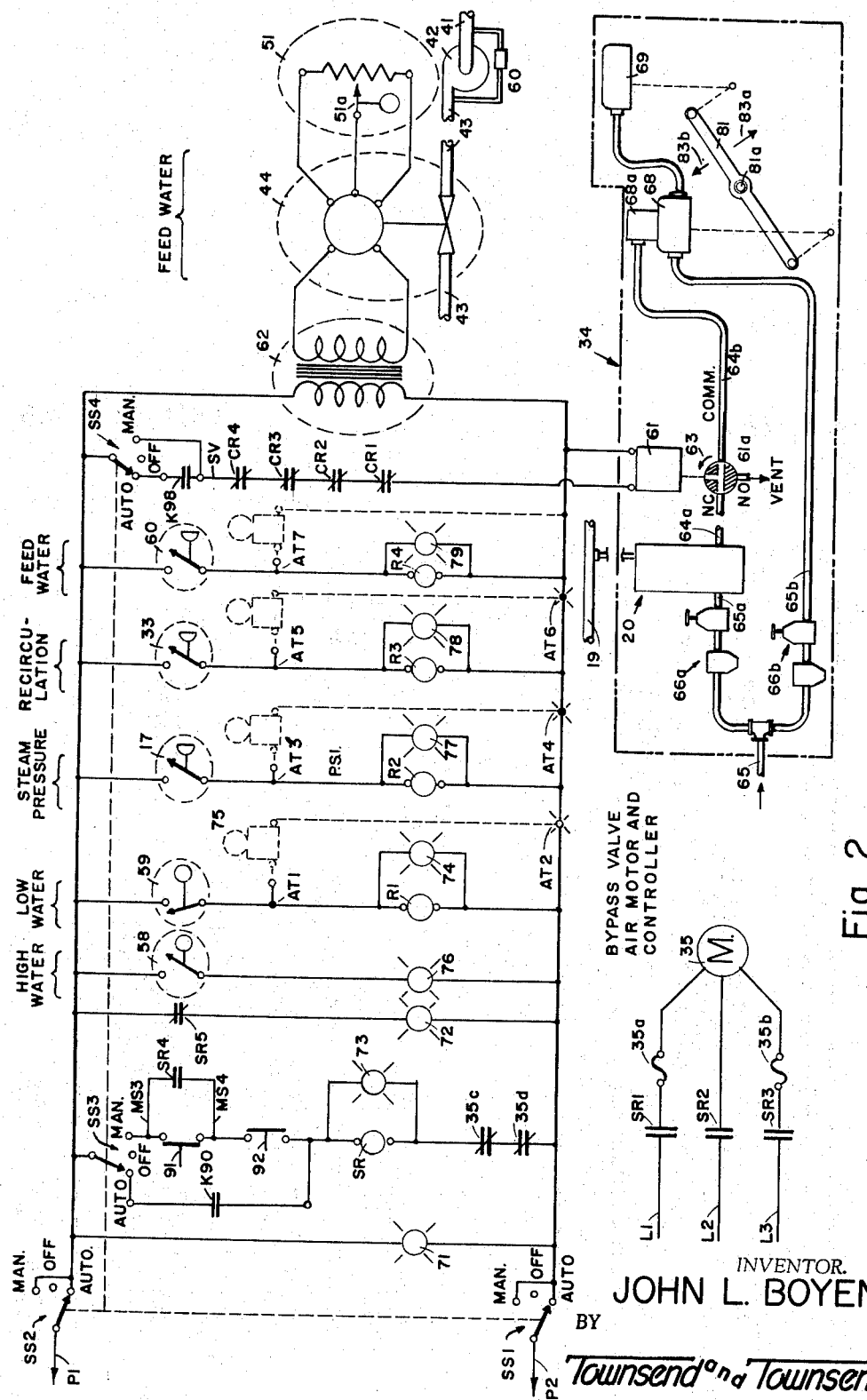
FIG. 2 is an electrical schematic diagram and a portion of the pneumatic net-work associated with the system shown in FIG. 1.

Recirculating pump 21 is driven by motor 35, also shown in FIG. 2, energized either by manual means or automatically upon commencement of operation of the turbine power unit. The sequence of these operations and certain electrical safety features are explained in greater detail below.

Reservoir 22 is in direct gravity fluid communication with the steam water separator to collect and provide preheated water for the forced recirculation through the boiler tube bundle. To make up for water losses and that converted to steam, a feedwater supply is provided. Feedwater from outside source pipe line 41 is constantly supplied by feedwater pump 42 through line 43 which communicates through feedwater modulating valve 44, also shown in FIG. 2 and explained below. Feedwater by-pass valve 45 is normally closed and feedwater by-pass valve 46 is normally open. After passage through the feedwater modulating valve, the feedwater passes through normally open feedwater by-pass valve 47, through inlet check valve 48, inlet stop valve 49 and hence through the remainder of conduit 43 to reservoir 22.

Feedwater modulating valve 44 is controlled by conventional feedwater level controller 51, which is in fluid communication with reservoir 22 through conduit 53 and the lower portion of the separator shell through conduit 54. As the reservoir water level raises or lowers variable resistance arm 51a, shown in FIG. 2, the feedwater level controller is varied to change the setting of the feedwater modulating valve 44. By such variable modulation of valve 44 to control the flow of feedwater as a function of the water level in reservoir 22, the reservoir water level is maintained between certain preselected and desired limits.

As one of several safety features to be explained in relation to my invention, high water sensitive cut-off switch 58 and low water sensitive cut-off switch 59, also shown in FIG. 2 with their electrical features as a part of the electrical control circuitry, are connected to each side of the feedwater level control by means of conduits 56 and 57. The elevation of switches 58 and 59 are at the safe upper and lower limits, respectively, of the water in the separator and reservoir. When the water level in the reservoir and steam water separator combination exceeds a certain preselected level, indicated by the position of the high water cut-off switch, said switch responds to close a contact in an electrical circuit, explained more fully hereinafter, which causes a red warning light to be energized. At the same time the feedwater level controller also responds to completely turn off feedwater valve 44 thus preventing additional feedwater from being introduced into the system until steam generation has caused the excess water level to drop.

Low water cut-off switch 59, similar to the high water cut-off switch, is adapted to close its contacts when the water level in the reservoir reaches a certain preselected low level indicated by the position of switch 59. When this low level of water occurs in reservoir 22, closing switch 59 contacts, a red warning light is illuminated and the by-pass valve air motor solenoid controller 34 is de-energized. This causes turbine exhaust gas damper 82, shown in FIG. 3, to move to the position indicated by dashed lines at 82a which causes all hot turbine exhaust gases introduced to the gas plenum and by-pass valve chamber to be expelled to the atmosphere through stack gas outlet 13a.

In addition to the safety features noted above, water pressure sensitive switch 60, shown in FIG. 1, is connected directly upstream and downstream of the feedwater supply pump 42; if the feedwater supply pressure should drop below a certain preselected level, switch 60, which is also electrically connected to the by-pass valve air motor solenoid controller, closes its contacts to cause complete by-passing of the hot turbine exhaust gases away from the water tube bundle and hence immediate attenuation of the steam generating process. Such by-pass continues until feedwater pressure is again present at the outlet of the feedwater supply pump at which time pressure switch 60 is caused to open its contacts, restore damper 82 to a normal operating position, and cause steam generation to resume.

Reference is now made to FIG. 2 of the accompanying drawings showing the electrical schematic diagram associated with my total energy conservation system and basic flow arrangement described above.

My invention is capable of either automatic or manual electrical control as indicated by the four sections of selector switch SS designated SS1, 2, 3 and 4. As shown in FIG. 2, the selector switch is in the automatic position causing "power on lamp 71 connected across the 115 v. A.C. pilot circuit legs P1 and P2 to be illuminated. All pressure and level sensitive electrical switches are shown in normal operating position with hot exhaust being delivered from the gas turbine. When the turbine power unit shown in FIG. 1 commences operation, a relay, K9, not shown in the accompanying drawings, is energized whereby contactors K9D and K9B are closed.

With the closing of K9D, relay SR is energized thus closing normally open contacts SR1, SR2, and SR3 which causes power from external electrical power source legs L1, L2, L3 to energize recirculating pump motor 35. Pump motor 35 in turn rotates recirculating pump 21, as shown in FIG. 1, to cause forced recirculation of water through the water tube bundle indicated at 101 in FIG. 3, and housed within housing 14 shown in FIGS. 1 and 3. At the same time normally closed contactor SR5 is opened to cause recirculating pump red warning lamp 72, which is in series with contactor SR5 and together with its connected across lines P1 and P2, to be de-energized. At the same time, recirculating pump "on" light 73 connected across relay SR is energized.

With the closing of contactor K9B noted above, current is conducted through normally closed contactors CR1, 2, 3 and 4 to energize by-pass valve air motor controller solenoid valve 61. With solenoid valve 61 energized, by-pass valve air motor 68 operates to position hot exhaust gas by-pass valve 82 shown in FIG. 3. The position that the air motor causes by-pass valve vane 82 to hold is regulated by the output steam pressure measured in conduit 19 by means of conventional proportioning controller 20. By this regulation, the amount of hot gas delivered to the water tube bundle is controlled; and hence the output steam in conduit 19 is regulated and maintained at a preselected steam pressure.

As shown in FIG. 2, under normal operation, solenoid valve 61 is energized and its three-way valve port 61a displaced in the direction of arrow 63 to cause fluid communication of air from the controlled air output of controller 20 through the normally closed (shown in the open operation condition) and common connection ports to air line 64b. Proportioned steam pressure controller 20 is connected at its steam inlet port to main header 19 and at its air inlet port to conduit 65a, which is a branch of air supply 65, through a conventional air filter and regulator indicated generally at 66a. The other half of the divided air supply communicates through the filter and regulator indicated generally at 66b and thence through conduit 65b to air motor 68. The air motor is pneumatically coupled to air cyclinder 69 and both are mechanically linked to arm 81 which is directly coupled by shaft 81a to by-pass valve vane 82, FIG. 3, within the chamber indicated generally at 13 and shown in FIGS. 1 and 3.

Air motor 68 is controlled in the amount of its displacement, i.e., the degree to which it opens or closes by-pass vane 82 by the movement of arm 81, by means of a conventional positioner 68a which in turn is controlled by the pressure of the air caused to pass through conduit 64b. The greater the pressure of air passed through line 64b, the further positioner 68a causes air motor 68 and cylinder 69 to rotate arm 81 and vane 82 in the direction of arrow 83a; the greater the amount of hot exhaust that is caused to contact the boiler water tubes; and the greater the amount of steam generated. Conversely, if the air pressure drops in conduit 64b, positioner 68a causes air motor 68 to lower its output; and conventional spring returns (not shown) in both the motor and cylinder 69 causes arm 81 and vane 82 to rotate in the direction of arrow 83b thus causing by-pass of the hot gases away from the boiler water tubes. Complete loss of air to positioner 68a causes complete bypassing of the hot gases and stopping of steam generation. If an electrical failure should occur, or if any of contacts CR1, 2, 3 or 4 open, solenoid valve 61 is de-energized, three-way portion 61a rotates in a direction opposite the arrow 63, and positioner 68a is vented to the atmosphere causing air motor 68 to minimum displacement. This causes vane 82 to a position which by-passes all hot exhaust gases from the gas turbine to the atmosphere.

Proportional controller 20 is one that I have found satisfactory in my invention, although other pneumatic designs might function equally well in its place. This particular controller is provided with an adjustable set point and proportional band so that it may be set to deliver a given air pressure signal to the air motor positioner with a predetermined steam pressure at conduit 19 and hence cause the gas by-pass vane to maintain a position that causes delivery of the predetermined steam pressure. If the steam pressure falls or rises, the proportional controller delivers more or less air pressure, respectively, to the air motor positioner and the steam generating process is altered to compensate accordingly. Although it is possible to utilize other types of proportional controllers, e.g., types using electrical or pneumatic positioner controllers with an electrical by-pass valve modulating motor, I prefer pneumatic control since its characteristics tend to eliminate hunting of the by-pass valve.

Figure 3:
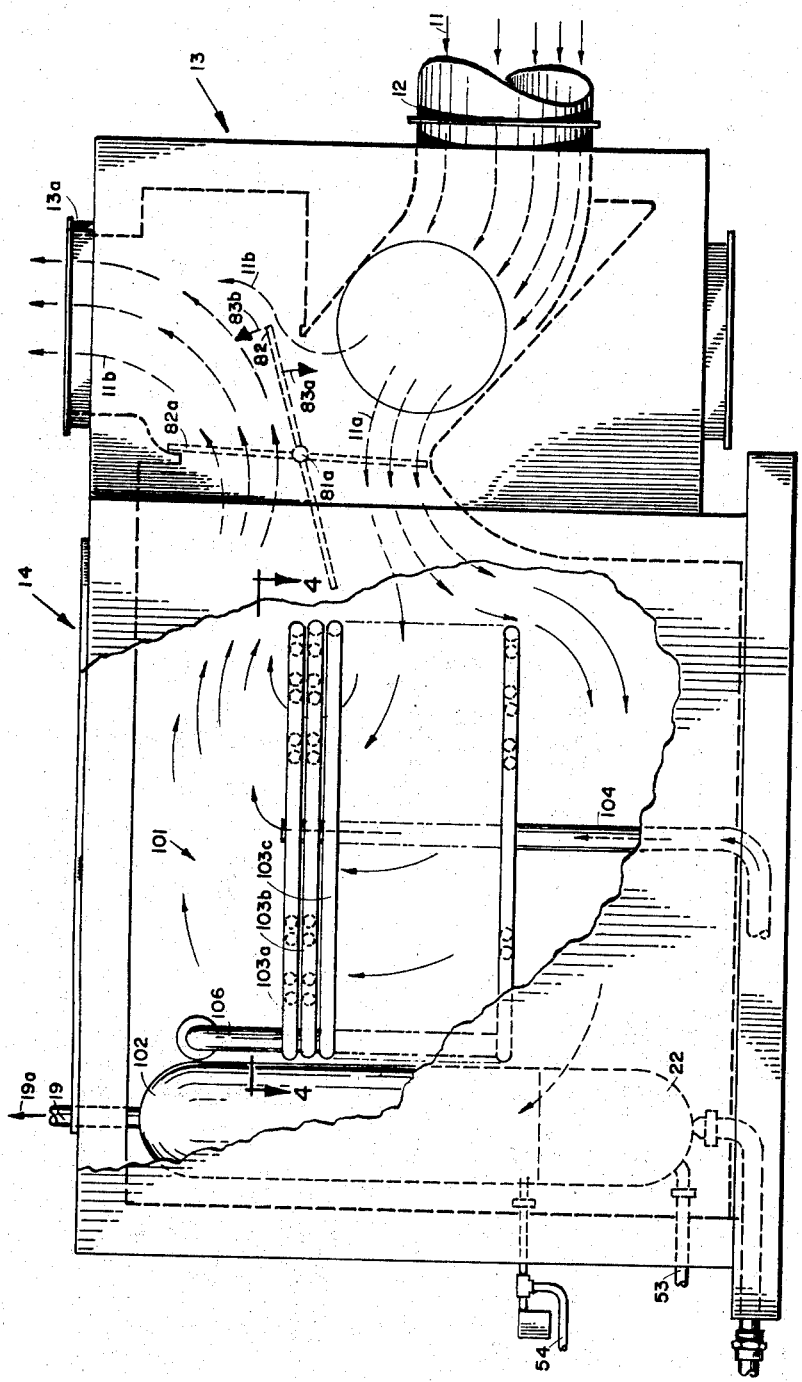
FIG. 3 is a partial cross-sectional elevation of a portion of the system shown in FIG. 1.

In the event that the water level in reservoir 22 shown in FIGS. 1 and 3 drops to a predetermined dangerously low level, low water switch 59, shown in the schematic diagram of FIG. 2 and in FIG. 3, is closed energizing relay R1 and low water level warning light 74 connected in parallel with said relay. In addition, if desired, alarm bell 75 shown in dotted line connected to terminals AT1 and AT2, is caused to be sounded. Simultaneously, normally closed contactor CR1, shown in circuit leg SV, which energizes controller solenoid valve 61, is opened and causes the solenoid valve to be de-energized. As explained above, this causes exhaust gas by-pass valve vane 82 to move in the direction of arrow 83b shown in FIG. 3, to by-pass all hot exhaust gases through stack gas outlet 13a. When the water level in the reservoir returns to its minimum normal position, water level sensitive switch 59 opens and relay R1 is de-energized; the red indicator light de-energizes; the alarm bell, if used silences; normally closed contactor CR1 again closes; and operation of the entire system resumes with a selected amount of gas turbine exhaust gas being conveyed to the water tube bundle.

In the event that the water level in reservoir 22 shown in FIGS. 1 and 3 rises to a predetermined and undesirably high level, high water switch 58, shown in the schematic diagram of FIG. 2, is closed energizing low water level warning light 76. In the particular embodiment of my invention as shown in the accompanying drawings, I do not include a relay in series with the high water level switch similar to that shown and described above in respect to low water switch 59. Although such a relay could be added for operation with a contactor such as contactor CR4 shown in circuit leg SV similar to that described above for low water switch 58, this is not as necessary a safety feature for high water cut-off as it is for low water. This is so because, unlike too much water in the system, excessively low water may result in permanent damage to the water tubes and other vital components in a relatively short period of time if the hot gases are not by-passed; and reliance upon an operator's response to visual and even audible alarms carries too heavy a burden of risk. On the other hand, excessive water in the system will not cause immediate damage, and the action of the feedwater modulator causes discontinuance of water flow to the boiler. In the meantime, hot gases which are caused to continue flowing into the plenum will tend to deplete the excess water by steam generation and return the system to normal operation without interruption of steam generation. Reliance upon the operator's observance of the warning light to check such return to normal does not present excessive risk to the system.

In the event that steam pressure present at the steam pressure safety switch 17, shown in FIGS. 1 and 2, exceeds a certain predetermined safe level, the corresponding contacts shown in FIG. 2 are closed thereby energizing relay R2 and warning red light 77 in parallel therewith. In addition, if an alarm bell is provided, as shown by the phantom lines indicating its connection between terminals AT3 and AT4, such alarm will be caused to sound. Simultaneously normally closed contactor CR2 is opened and controller solenoid valve 61 will be de-energized to cause the hot exhaust gases to be expelled through stack gas outlet 13a. This immediately attenuates further steam generation in the water tube bundle. Upon return to the preselected normal minimum safe level for steam pressure as sensed by pressure switch 17, relay R2 is de-energized; red warning lamp 77 is de-energized; the alarm bell, if any, connected between terminals AT3 and AT4 is silenced; normally closed contactor CR2 closes thus energizing controller solenoid valve 61; and hot exhaust gases may again be conveyed to contact the water tube bundle generating steam within the unit.

In the event that the differential pressure across recirculating pump 21 shown in FIG. 1 should fall to a preselected low, indicating that the flow of recirculating water has been reduced below the level of safe water replenishment, the contact shown at differential pressure switch 33 in FIG. 2 is closed thus energizing relay R3; red warning lamp 78 in parallel therewith; and, optionally, the alarm bell shown in phantom line connected between terminals AT5 and AT6. Simultaneously, normally closed contactor CR3 is opened and the hot gas turbine exhaust gases are completely shunted away from the water tube bundle and out through gas stack 13a. Upon return of proper differential pressure across recirculating pump 21, differential pressure sensitive switch 33 is opened; relay R3 de-energized; alarm lamp 78 de-energized; the alarm bell, if used, between terminals AT5 and AT6 is silenced; and contactor CR3 is returned to its normally closed position to cause the controller solenoid valve to be re-energized and hot gases again directed in preselected amounts upon the water tube bundle.

Should the recirculating pump motor 35 cease operating due to thermal overload, thermal overload elements 35a and 35b provided as shown in FIG. 2 in power legs L1 and L3 open and disconnect the motor from the line. With this condition, pump 21 stops rotating and steam generation is turned off by the action of differential pressure switch 33 as explained above. Additional overload protection for the recirculating pump motor is provided by an overload relay, not shown, but whose normally closed contacts 35c and 35d are shown connected in series with relay SR. When current is interrupted to relay SR by the opening of either overload contactor 35c and 35d, normally closed contact SR5, normally held open by the current through relay SR, is caused to close so that red warning lamp 72 is energized.

Connected across 115 volt A.C., 60 cycle, pilot circuit line legs P1 and P2 is 115 volt A.C., step-down, transformer 62 whose 24 volt A.C. output energizes modulating feedwater valve 44. The modulation of valve 44 is accomplished by conventional techniques known in the electrical art and the level of the water in reservoir 22 raising and lowering resistor arm 51a. In the event of a rising water condition in reservoir 22, which could eventually also cause high water switch 58 to close and initiate a sequence of steps described hereinabove, resistor arm 51a is elevated to cause the modulating feedwater valve to be driven toward the off position. This diminution of water flow through valve 44 persists until additional steam generation within the water tube bundle depletes the excess water supply in reservoir 22. This in turn causes resistor arm 51a to lower and drive the modulating feedwater valve toward the open position to cause feedwater to pass again into the reservoir. In actual operation, after the start up period, an equilibrium point is reached wherein steam generation and feedwater recirculation become stabilized in a steady state condition subject to change in the event of a change in steam demand, reaction by any one of the above described safety features, or shut down of the system. Shut down of the system may be accomplished either automatically by de-energizing relay K9 (not shown), which causes contactors K9B and D to open, or by moving the selector switch from the automatic position shown in FIG. 2 to the "off" position indicated therein.

Although the foregoing specification describes one embodiment of my invention with the selector switch having sections generally indicated at SS1, SS2, SS3 and SS4, all shown in FIG. 2, in the automatic position, the system may also be operated manually. This is accomplished by moving the ganged selector switches to the position marked "man.," or manual, whereby the leads of power circuit legs L1 and L2 are moved from their respective automatic positions shown in FIG. 2 to the indicated "man." or manual positions. When the switch to manual position is made, contactor K9D is disconnected from the circuit and contactor K9B is by-passed as indicated in the schematic diagram. When contactor K9D is eliminated from the circuit, the recirculating pump motor is energized by depressing pump "start" button 91 which then completes the pilot circuit power through relay SR and events commence as described hereinabove for automatic operation. In addition, when the selector switches are set for manual operation, normally open contactor SR4, connected electrically in parallel with pump "start" button 91, is closed by the energization of relay SR. This is a conventional "seal-in" circuit arrangement whereby when the pump's "start" button is released, and the spring return opens the button circuit itself, current is still supplied to relay SR through contactor SR4 and the pump "stop" button, which is normally closed, to complete the circuit through contactors 35c and 35d to pilot circuit leg P2.

All safety features and operation of relays R1, 2 and 3 may occur in the manual condition in a manner similar to that as described above in the case of the automatic condition.

The system may be shut down manually by depressing "off" button 92. This opens the circuit to relay SR which causes pump motor 35 to shut-off and consequently discontinue pilot circuit power to solenoid valve 61 and transformer 62. This causes both the feedwater supply and the hot turbine gases to the boiler tubes to be shut off.

Having explained my invention in respect to steam flow generally, water recirculation, and the interaction of various pneumatic and electrical devices therewith, attention is now directed to FIG. 3 which shows in greater detail the hot gas by-pass chamber, water tube boiler, and steam separator.

Hot gases exhausted from the turbine shown in FIG. 1 are conveyed in the direction of arrows 11 to the hot gas plenum indicated generally at 13 via inlet conduit 12. Depending upon the setting of by-pass valve damper 82, a function of the operation of various components of my invention as explained hereinabove, a portion of the hot exhaust gases indicated by arrows 11b are by-passed directly through outlet stack 13a. The remainder of the hot gases are deflected in the direction of arrows 11a and are directed inwardly to the tube bundle enclosure indicated generally at 14. This chamber primarily houses two major components of my invention; the tube bundles indicated generally at 101 and the centrifugal steam water separator indicated generally at 102. Although various types of steam-water separators may be used in my invention, I prefer the use of my centrifugal steam-water separator as shown in my co-pending application and referred to earlier herein.

Figure 4:
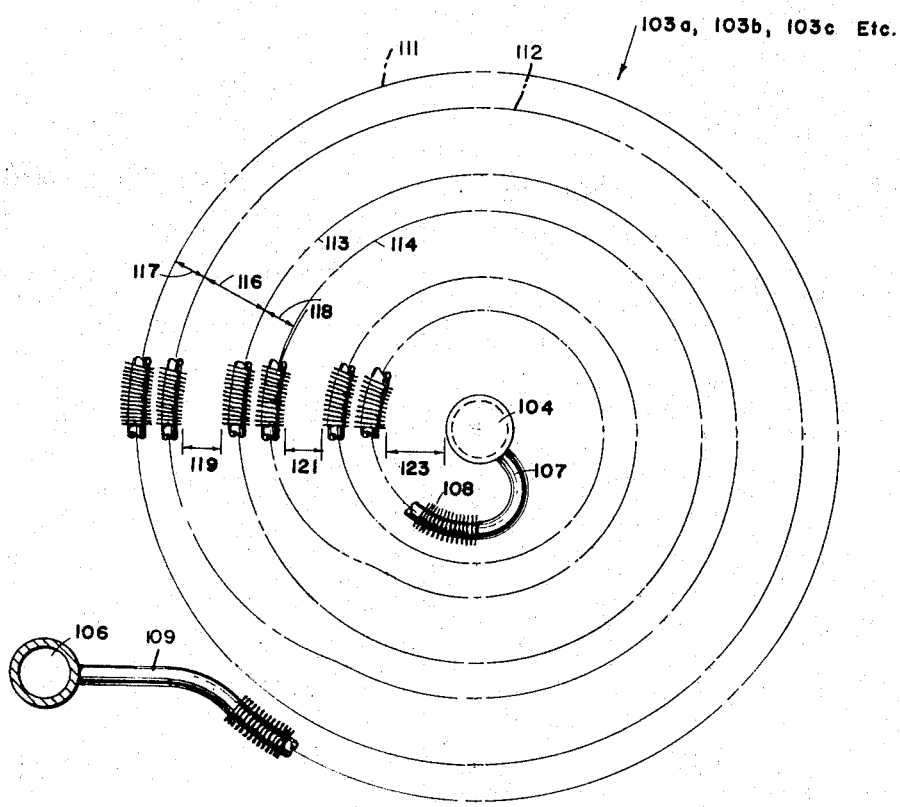
FIG. 4 is a plan view taken along line 4—4 of FIG. 3.

The water tube bundles generally indicated at 101 comprise a stack of spiral tubes indicated generally at 103a, b, c, etc., and shown in greater detail in FIG. 4. Each coil comprises a flat, spirally coiled, tube element. These are arranged, or stacked, vertically and attached to a vertical inlet header 104 which is in fluid communication with recirculating pump outlet piping 29 shown in FIG. 1. Vertical outlet header 106 is in fluid communication with each spiral coiled tube element at the outermost terminus of each spiral by means of the several tubes 109. With this arrangement each tube element represents a parallel flow path for the water and steam generated mixture circulating from inlet header 104 toward oulet header 106 and hence to the separator indicated generally at 102. The gas flow indicated by arrows 11a in FIG. 3 is radially from the outside of the tube assembly to the interior thereof. As the hot gases flow through the tube assembly, they are cooled and their velocity tends to drop. However, simultaneously, the cross sectional area of the assembly is decreasing so that the gas velocity actually remains almost constant. This results in almost optimum heat transfer conditions in all parts of the tube assembly. Since the water flow is from inside header 104 to outside header 106, desirable counter-flow conditions between the hot gases on the outside and the water being heated inside the tubes prevails. After the gases have passed the tubing in counterflow passage, and heat transfer has occurred to produce the steam water mixture in header 106, the gases flow through and join the earlier by-passed gases indicated by arrows 11b for egress through stack 13a. In this invention the hot gases are caused to flow through a relatively unrestricted path to heat the water tubes. This design in combination with the novel configuration of the water tube pancake stack causes a minimum pressure drop to develop between inlet conduit 12 and outlet exhaust stack 13a and, in turn, causes minimum back pressure to be imposed on the gas turbine generally indicated at A in FIG. 1.

Each flat spirally coiled tube element indicated generally at 103a, b, etc., in FIG. 3, and best shown singly in FIG. 4, comprises curved inlet tube 107, finned spiral portion 108 and curved tube outlet portion 109. In a typical arrangement of the spiral tube element, two normal spiral turns as indicated by center lines 111 and 112 are followed by a wider spacing 116 before repeating normally spaced center lines 113 and 114. Interval 116 between center lines 112 and 113 is greater than the interval 117 between center lines 111 and 112 or interval 118 between center lines 113 and 114. As a result of this configuration, spaces are provided such as those indicated by dimensions 119 and 121 between the outermost finned surfaces of every two turns of the spiral coil tube element. The existence of such gaps, and space 123 between the innermost spiral and inlet header 104, further minimize the pressure drop through the tube system by forming unrestricted spaces for gas flow. These same spaces provide ready access between the tubes to permit cleaning agents and tools to be manipulated therebetween and clearance to facilitate proper maintenance.

Tubing 108 is of the finned type and although a variety a such tubing is readily available, I have found extended surface tubing having a 1.25 inch O.D. and a .095 inch wall to be satisfactory. Heavier walled tubing may be employed if required by pressure conditions. The .095 inch wall tubing which I employ is provided with fins 124, ten fins per lineal inch, and may be ASME specification SA 178 or equal. The heating surface of the tubes is thus 2.3 square feet per lineal foot. Radial fins 124 are segmented to produce maximum turbulence of the passing gases and circumferentially welded to insure optimum heat transfer. These fins increase the heat transfer capability per lineal foot of tubing to approximately eight times that of plain tubing.

The use of extended surface or finned tubing with a relatively large inside diameter to form the spiral tube elements minimizes the effect of through-put caused by scale forming materials which may be in the feedwater. The relatively heavy walled tubing used minimizes the harmful effects of pinpoint or pitting type corrosion and greatly extends the life of the boiler. All pressure welds, such as those connecting curved tube portions 107 and 109 to headers 104 and 106, respectively, preferably are both tested hydrostatically at not less than 1½ times design pressure and inspected in accordance with the ASME code.

Although I have described my invention in some detail in the foregoing specification, this has been done by way of example for purposes of clarity of understanding and is not intended to impose unnecessary limitations upon my invention. It is understood that my invention may be practiced in a great variety of versions substituting, changing, or modifying various components while using the system which I have disclosed and remaining within its spirit and the scope of the appended claims.

What is claimed is:

1. Apparatus for exchanging heat between a first fluid and a second fluid having a different temperature from the first fluid comprising at least a pair of stacked hollow fluid impervious tubes that are parallelly spaced apart to define a radial fluid path therebetween, each tube being formed into a convoluted spiral of substantially planar configuration and having an inlet at the inner spiral extremity thereof and an outlet at the outer spiral extremity, means for conveying the first fluid to said inlet ends and exhausting the first fluid from said outlet ends so that in traversing each said tube the first fluid advances radially outwardly of said spiral, and means for forcing the second fluid along said radial fluid path from the periphery of the spiral tube configuration radially inwardly to the center thereof in the space between said pair of tubes and counter to the first fluid in said tubes.

2. In a waste heat recovery system having a hot gas source, the combination comprising: an insulated enclosure having a hot gas inlet and an exhaust outlet; a plenum having an inlet in fluid communication with said hot gas source and an outlet in fluid communication with said gas inlet; damper means mounted in said plenum to regulate the amount of gas communicated to said enclosure; water tube boiler means having an input header and an output header mounted within said enclosure to produce a mixture of steam and water in said output header; means associated with said plenum and said water tube boiler means to minimize the pressure drop of gas communicated through said enclosure; feedwater means in fluid communication with said input header to supply water to said boiler means; and separator means having a steam outlet pipe and in fluid communication with said output header to separate the steam and water mixture output of said boiler means; steam pressure sensitive means in fluid communication with said steam outlet pipe to regulate said damper means to cause gas communication to said enclosure to vary inversely with the outlet steam pressure; and water level sensitive means in fluid communication with said feedwater means to regulate said damper means and prevent gas communication to said enclosure in the event of failure of said feedwater means.

3. A closed system for the recovery of waste heat energy from hot exhaust gas from a heat source, said system having a boiler provided with a source of feedwater in fluid communication with a steam-water separator and reservoir, comprising in combination: an insulated enclosure in fluid communication with said source and having a divided gas outlet to form an exhaust to atmosphere and a boiler gas inlet, said divided gas outlet provided with damper means to regulate the amount of flow of hot gas therethrough responsive to steam pressure at the outlet of said separator, the water level in said separator and reservoir, and to feedwater pressure in the system; said boiler having internal circulating water and mounted adjacent to said insulated enclosure in the path of hot gas discharged from said boiler gas inlet, the boiler designed to transfer the heat energy of said hot exhaust gas discharged from said boiler gas inlet to said circulating water to produce a mixture of steam and water; water regulating means in fluid communication with said boiler to produce a predetermined excess of said internal circulating water; said separator adapted to separate said mixture of steam and water and direct the water separated from the mixture to said reservoir; liquid level sensing means in liquid communication with said separator and reservoir to sense the level of water in the separator and reservoir and control said damper means and said water regulating means to increase the volume of hot gas flow through said boiler gas inlet as said level of water increases and to control said water regulating means to control the volume of flow of said feedwater, and to prevent further the hot exhaust gas from being conveyed through the boiler gas inlet when the liquid level reaches a predetermined low point; and means in fluid communication with the steam output of said separator to sense the pressure of the output steam and control said damper means to increase the volume of hot gas flow through said boiler gas inlet as said steam pressure decreases below a first predetermined level, decrease the volume of hot gas flow through the boiler gas inlet as the steam pressure increases above a second predetermined level, and prevent gas flow through the boiler gas inlet when the steam pressure reaches a third predetermined level.

4. In a system for recovering heat energy from exhaust gases expelled by a source having an operating efficiency inversely proportional to the back pressure imposed thereon, the combination comprising: a boiler; means adjacent to said boiler and in fluid communication with said source to convey said exhaust gases away from the source and divide selectively the flow of the gases for exhaust to the atmosphere and to said boiler for heating, said means and said boiler arranged and constructed to impose minimal obstruction to said exhaust gas flow for heating the boiler and cause relatively minor back pressure on said source; feedwater means in fluid communication with said boiler to provide water for conversion to a mixture of water and steam; and automatic regulating means associated with said means adjacent to said boiler and said feedwater means responsive to the pressure of generated steam from the boiler, water pressure in the feedwater means, and the level of said water provided by the feedwater means, said regulating means to control the selective division of the flow of gas in said means adjacent to the boiler and the flow of water provided by the feedwater means to cause a relatively constant predetermined level of steam pressure at the outlet of said boiler in equilibrium with a selected division of the flow of gas in said means adjacent to the boiler and the flow of water provided by the feedwater means.

5. A boiler to produce a mixture of steam and water adapted for use in the path of hot gases and provided with a source of feedwater, comprising: an inlet header pipe having one end capped and the other end in fluid communication with said source of feedwater; an outlet header pipe having one end capped and the other end for discharging said mixture of steam and water, said outlet pipe in spaced parallel relation with said inlet header; and a plurality of spaced apart spirally coiled tubes each having one end connected in fluid communication with said inlet header and the other end connected in fluid communication with said outlet header, each said tube defining at least about four spiral turns grouped in pairs, adjacent turns of each said pair spaced relatively close together and adjacent turns of successive pairs spaced apart a distance at least equal to the diameter of a said tube.

References Cited

UNITED STATES PATENTS

| | | | |
|---|---|---|---|
| 1,053,491 | 2/1913 | Grimm | 122—250 X |
| 1,332,943 | 3/1920 | Cabena | 122—480 |
| 2,060,290 | 11/1936 | Ebner | 122—7 |
| 2,578,059 | 12/1951 | Graham | 165—163 |
| 2,697,421 | 12/1954 | Nalven | 122—7 |

FOREIGN PATENTS

| | | |
|---|---|---|
| 94,992 | 12/1962 | Denmark. |
| 750,124 | 6/1956 | Great Britain. |
| 878,189 | 9/1961 | Great Britain. |

CHARLES J. MYHRE, *Primary Examiner.*